United States Patent
Han et al.

(10) Patent No.: US 11,795,073 B2
(45) Date of Patent: Oct. 24, 2023

(54) ELECTROCOAGULATION DEVICE

(71) Applicant: AMOGREENTECH CO., LTD., Gimpo-si (KR)

(72) Inventors: Kyung Gu Han, Goyang-si (KR); Jin Lee, Incheon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 523 days.

(21) Appl. No.: 16/489,479

(22) PCT Filed: Mar. 15, 2018

(86) PCT No.: PCT/KR2018/003031
§ 371 (c)(1),
(2) Date: Aug. 28, 2019

(87) PCT Pub. No.: WO2018/169321
PCT Pub. Date: Sep. 20, 2018

(65) Prior Publication Data
US 2020/0048113 A1 Feb. 13, 2020

(30) Foreign Application Priority Data

Mar. 16, 2017 (KR) .................. 10-2017-0033078
Mar. 15, 2018 (KR) .................. 10-2018-0030096

(51) Int. Cl.
*C02F 1/463* (2023.01)
*C02F 1/461* (2023.01)

(52) U.S. Cl.
CPC .......... *C02F 1/463* (2013.01); *C02F 1/46104* (2013.01); *C02F 2001/46133* (2013.01); *C02F 2201/4619* (2013.01)

(58) Field of Classification Search
CPC .............. C02F 1/463; C02F 1/46104; C02F 2001/46133; C02F 2201/4619;
(Continued)

(56) References Cited

U.S. PATENT DOCUMENTS

| 6,783,687 B2 * | 8/2004 | Richard | ................ C02F 1/4604 |
| | | | 204/557 |
| 2005/0274606 A1 * | 12/2005 | Powell | ................ C02F 1/463 |
| | | | 204/228.2 |

(Continued)

FOREIGN PATENT DOCUMENTS

| IN | 201947034197 | 9/2019 |
| IN | 201947034198 | 9/2019 |

(Continued)

OTHER PUBLICATIONS

Screen_definition_NPL.pdf (Year: 2022).*
International Search Report—PCT/KR2018/003031 dated Jul. 19, 2018.

*Primary Examiner* — Ekandra S. Miller-Cruz
(74) *Attorney, Agent, or Firm* — CANTOR COLBURN LLP (57) ABSTRACT

An electrocoagulation device is provided. An electrocoagulation device comprises: a housing having an inner space; a containing member arranged in the inner space; at least two electrode plates arranged outside the containing member so as to face each other such that power supplied from the outside is applied thereto; and a plurality of conductive lumps having a predetermined volume, which are contained in the containing member so as to contact each other and to form pores through which raw water can pass, wherein contaminants included in the raw water are coagulated through electrocoagulation as the same pass through the pores.

8 Claims, 8 Drawing Sheets

(58) Field of Classification Search
CPC ........ C02F 1/46114; C02F 2001/46119; C02F 2001/46152; C02F 1/484; C02F 1/001; C02F 2201/483; B03C 3/02; B03C 1/32; B03C 2201/18
USPC .................................................. 210/223, 243
See application file for complete search history.

(56) References Cited

U.S. PATENT DOCUMENTS

| | | | | |
|---|---|---|---|---|
| 2011/0042234 A1* | 2/2011 | Magalnik | ............. | C02F 1/4676 |
| | | | | 205/744 |
| 2011/0233153 A1* | 9/2011 | Arifin | .................... | C02F 1/001 |
| | | | | 210/291 |
| 2014/0339162 A1* | 11/2014 | Cao | ........................ | C02F 9/00 |
| | | | | 210/243 |

FOREIGN PATENT DOCUMENTS

| | | | | |
|---|---|---|---|---|
| KR | 20040092663 | | 11/2004 | |
| KR | 20060025347 | | 3/2006 | |
| KR | 100617479 | | 9/2006 | |
| KR | 20060128244 | | 12/2006 | |
| KR | 100686286 | | 2/2007 | |
| KR | 100815235 | | 3/2008 | |
| KR | 20110079127 A | * | 7/2011 | ............. C02F 1/463 |
| KR | 20120021366 | | 3/2012 | |
| KR | 20120021366 A | * | 3/2012 | ............. C02F 1/463 |
| KR | 20140142942 | | 12/2014 | |
| WO | WO-2015176137 A1 | * | 11/2015 | ............. B01D 17/06 |

* cited by examiner

ELECTROCOAGULATION DEVICE

TECHNICAL FIELD

The present invention relates to a pollutant treatment device for water treatment, and more specifically, to an electrocoagulation device configured to effectively remove pollutants contained in raw water using the electrocoagulation principle and reduce an amount of power consumption.

BACKGROUND ART

Water pollution due to nitrate is caused by industrial wastewater and excessive use of chemical fertilizers in agricultural areas. When nitrogen-containing compounds are introduced into water, water quality degradation such as eutrophication occurs in the water. In addition, when a person ingests the water containing the nitrogen-containing compounds, the nitrogen-containing compounds can cause health disturbances such as cancer, cyanosis, and the like.

Nowadays, methods for removing nitrate from wastewater include an ion exchange resin method, a biodegradation method, a reverse osmosis method, and a catalyst denitrification method. The ion exchange resin method has a process which is useful for treating groundwater but leaves a number of residual components which are unnecessary in treated water, and the biodegradation method has a process which is useful for treating surface water but has a disadvantage in that a long treatment time period is generally required. In addition, the method using reverse osmosis or electrodialysis can achieve a nitrate removal efficiency of about 65% but has a disadvantage in that a cost of energy input is high.

Accordingly, an electrocoagulation method through which an amount of an applying current is adjusted to provide an exact amount of coagulating agent, automation is facilitated, energy consumption is low, and pollutants are destabilized, coagulated, and separated using one process has been in the spotlight.

The electrocoagulation method is a method through which metal ions are eluted from an electrode plate when a current is provided thereto, the eluted metal ions are adsorbed onto and coagulated to the pollutants in wastewater so that the pollutants float or are precipitated by hydrogen and chlorine gas.

However, in the conventional electrocoagulation method, since a plurality of electrode plates formed in plate shapes are disposed to be spaced apart from each other between a pair of power electrodes, a difference in amount of power consumption occurs according to relative distances between the power electrodes which power is applied. Accordingly, since replacement time periods of the plurality of electrode plates, which are disposed between the pair of power electrodes, are different from each other according to the relative distances between the power electrode and each of the plurality of electrode plates, there is a problem in that maintenance is troublesome.

In addition, since an amount of power consumption of the conventional electrocoagulation method is large, there is a problem in that a production cost increases.

DISCLOSURE

Technical Problem

The present invention is directed to providing an electrocoagulation device capable of reducing an amount of power consumption while achieving a desired treatment efficiency.

In addition, the present invention is directed to providing an electrocoagulation device in which replacement time periods of electrode plates are the same regardless of distances between the electrode plates and a power electrode.

Technical Solution

One aspect of the present invention provides an electrocoagulation device including a housing including an inner space, an accommodation member disposed in the inner space, at least two electrode plates which are disposed on outer sides of the accommodation member to face each other and to which power supplied from the outside is applied, and a plurality of conductive masses which have predetermined volumes, and are accommodated in the accommodation member so as to form air gaps through which raw water passes while being in contact with each other, wherein pollutants contained in the raw water are coagulated through electrocoagulation while passing through the air gaps. Here, the plurality of conductive masses may be electrically connected to the at least two electrode plates via the raw water introduced into the inner space.

The accommodation member may be formed of an insulating material or non-conductive material. As an example, the accommodation member may be formed of any one material among plastic, plywood, and concrete.

The accommodation member may include a plurality of first through holes which are formed to pass through a bottom surface so as to introduce the raw water introduced into the inner space into an accommodation space, and a plurality of second through holes which are formed to pass through a side portion of the accommodation member so as to move the raw water introduced into the accommodation space to the two electrode plates.

A thickness of a portion, in which the second through holes are formed, of the accommodation member may range from 1 to 10 mm.

The conductive mass may have a three dimensional form and at least one through hole may be formed to pass through the conductive mass so as to increase a surface in contact with the raw water.

A magnitude of a current or a voltage applied to the two electrode plates may be determined according to a total surface area of the conductive masses coming into contact with the raw water.

The accommodation member may be detachably coupled to the housing.

The inner space may include a first chamber into which the raw water is introduced, a second chamber which is disposed above the first chamber and in which the accommodation member is disposed, and a third chamber in which treated water, of which an electrocoagulation reaction is completed in the second chamber, is temporarily stored.

Each of the two electrode plates may be formed of an insoluble material.

Another aspect of the present invention provides an electrocoagulation device including an electrocoagulation device including a housing which is formed of an insulating material or non-conductive material and includes an inner space, an accommodation member which is formed of an insulating material or non-conductive material and disposed in the inner space, at least two electrode plates which are disposed on outer sides of the accommodation member to face each other and to which power supplied from the outside is applied, and a plurality of conductive masses which have predetermined volumes, are in contact with each other so as to form air gaps through which raw water passes, are accommodated in the accommodation member, and are electrically connected to the at least two electrode plates via the raw water introduced into the inner space, wherein pollutants contained in the raw water are coagulated due to metal ions generated from the plurality of conductive masses while passing through the air gaps.

Advantageous Effects

According to the present invention, since power consumption of an electrocoagulation device is reduced while treatment efficiency higher than or equal to that of a conventional electrocoagulation device using plate-shaped electrode plates is achieved, a production cost can be decreased.

According to the present invention, since contamination and/or damage of conductive masses may be prevented or foreign matter adhered to the conductive masses can be removed by bubbles supplied by a diffuser, a maintenance cost can be decreased.

MODES OF THE INVENTION

Hereinafter, embodiments of the present invention will be described in detail with reference to the accompanying drawings in order for those skilled in the art to easily perform the present invention. The present invention may be implemented in several different forms and is not limited to the embodiments described herein. Parts irrelevant to description are omitted in the drawings in order to clearly explain the present invention. In addition, components which are the same or similar to each other are assigned with the same reference numerals.

Figure 1:
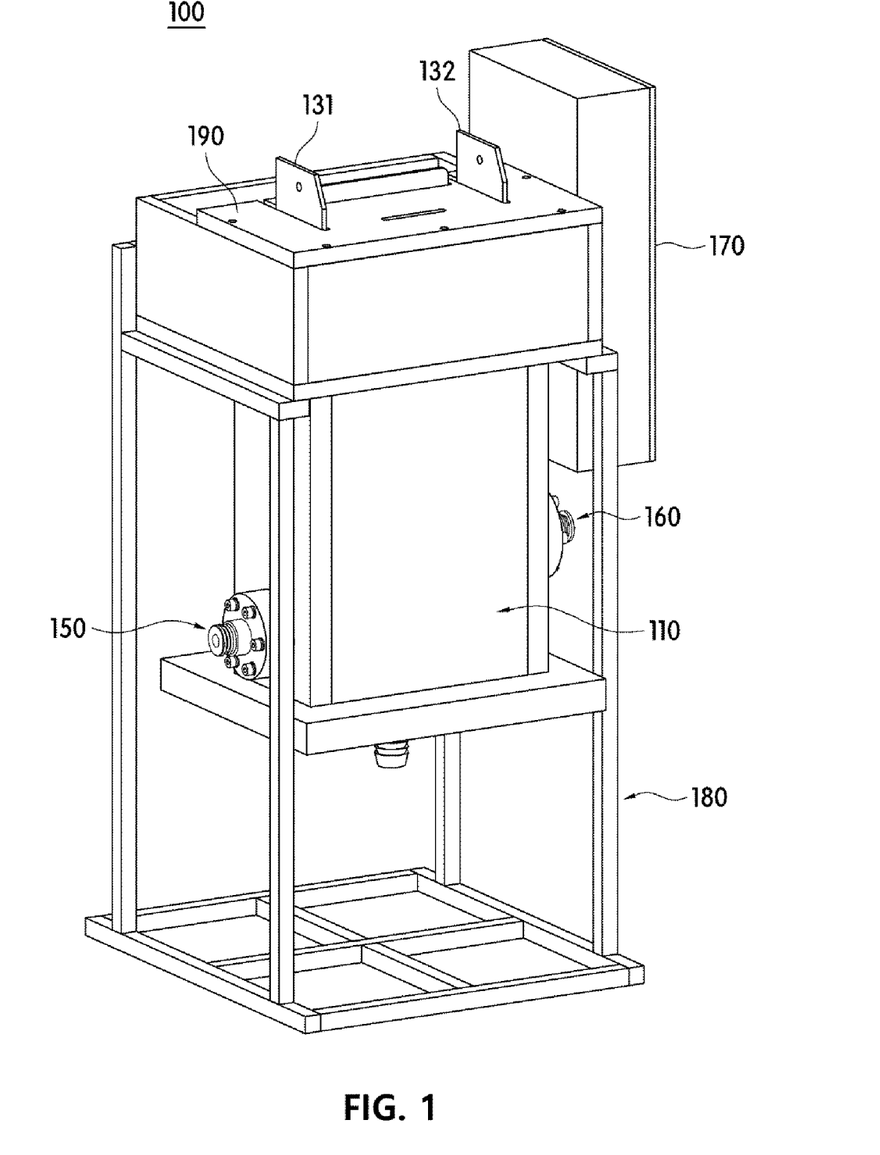
FIG. 1 is a schematic view illustrating an electrocoagulation device according to one embodiment of the present invention.
Figure 2:
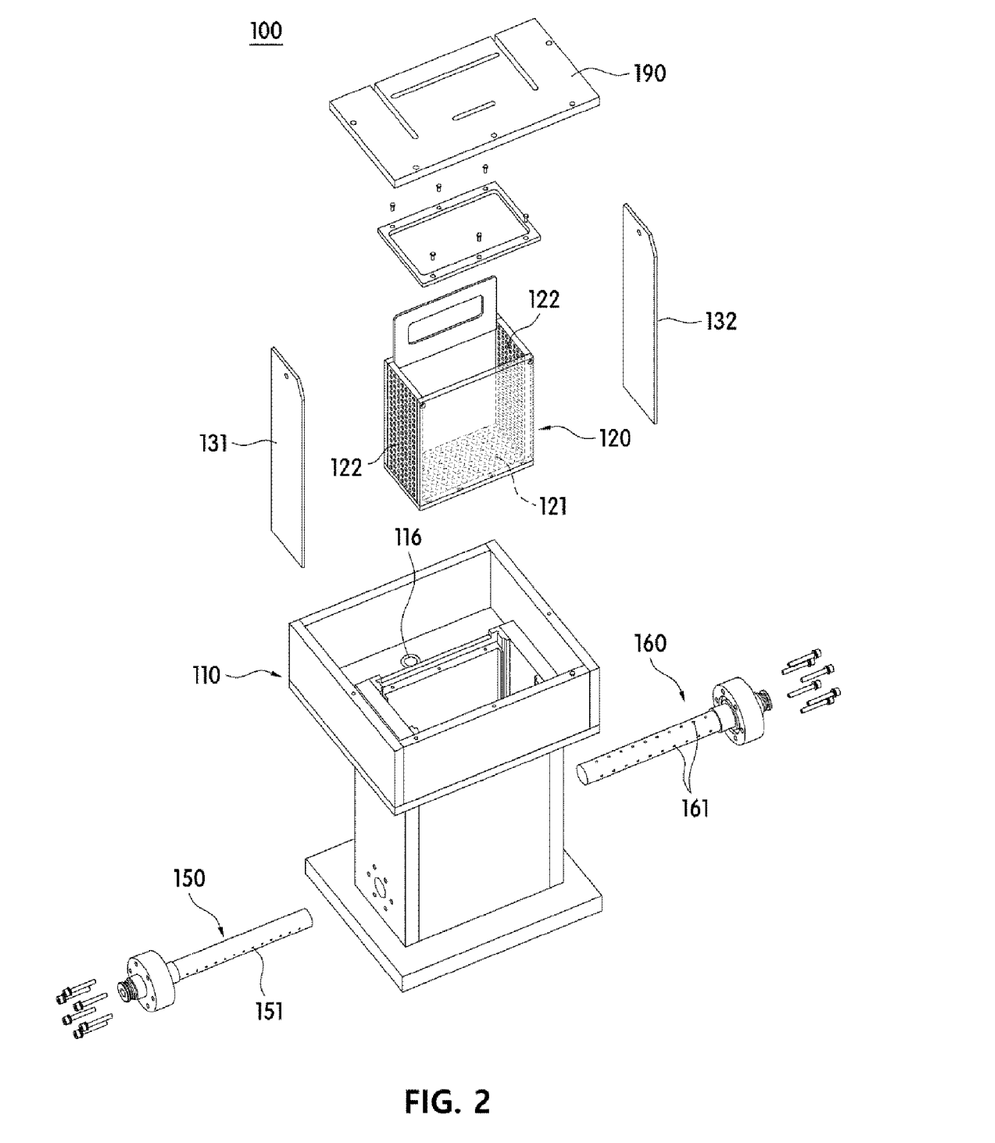
FIG. 2 is an exploded view of FIG. 1.

As illustrated in FIGS. 1 and 2, an electrocoagulation device 100 according to one embodiment of the present invention includes a housing 110, an accommodation member 120, at least two electrode plates 131 and 132, and conductive masses 140.

The housing 110 may provide a space which temporarily stores raw water which is supplied from the outside and should be treated. In the present invention, the raw water to be treated may be, without limitation, sewage, wastewater, seawater, or fresh water from which pollutants need to be removed.

Here, the housing 110 may be formed to have a box form having an inner space, and an upper portion of the inner space may be open. Here, the inner space may be a staying space in which the raw water supplied from the outside is accommodated.

Accordingly, in the electrocoagulation device 100 according to one embodiment of the present invention, while the raw water introduced from the outside is accommodated in the inner space, pollutants contained in the raw water may be electrocoagulated using the two electrode plates 131 and 132 and the conductive masses 140, and the coagulated pollutants may be transferred to a separate treatment space.

To this end, the inner space may include a first chamber 111 into which the raw water is introduced, a second chamber 112 in which the accommodation member 120 is disposed, and a third chamber 113 which temporarily stores treated water of which an electrocoagulation reaction is completed in the second chamber 112.

Here, the second chamber 112 may be formed above the first chamber 111, and the third chamber 113 may be formed side by side of the first chamber 111. In addition, the second chamber 112 and the third chamber 113 which are disposed side by side with each other may be partitioned by a sidewall 114 which defines the second chamber 112.

Accordingly, the first chamber 111 may serve as a buffer space in which the raw water is accommodated before being transferred to the second chamber 112. Accordingly, the raw water introduced into the first chamber 111 may be transferred to the second chamber 112 in which an electrocoagulation reaction occurs while maintaining a uniform water level thereof. Accordingly, the raw water introduced into the second chamber 112 may slowly move from a lower portion of the accommodation member 120 filled with the conductive masses 140 to an upper portion thereof.

Figure 5:
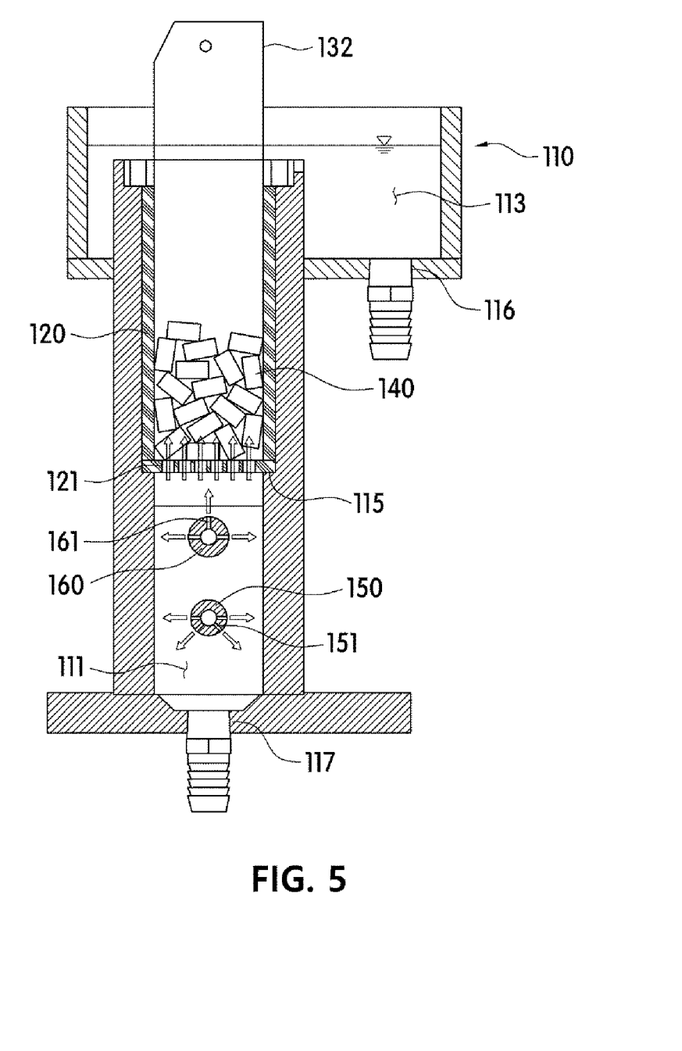
FIG. 5 is a cross-sectional view taken along line A-A of FIG. 3.
Figure 6:
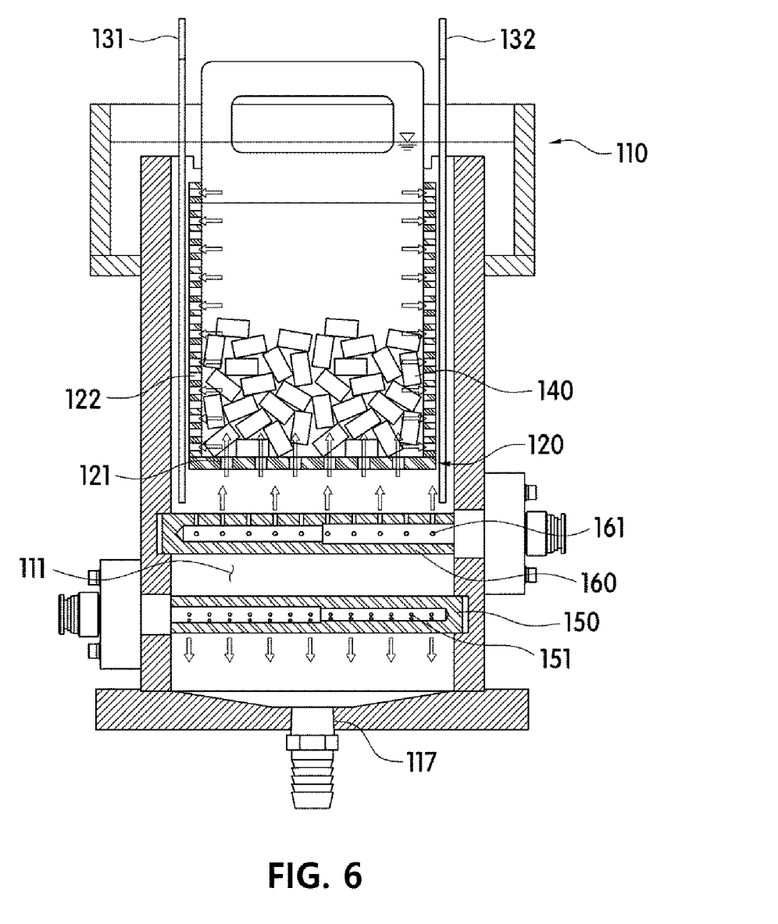
FIG. 6 is a cross-sectional view taken along line B-B of FIG. 3.
Figure 7:
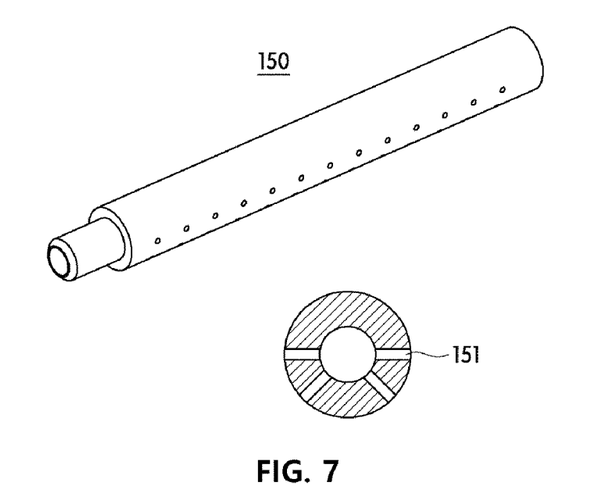
FIG. 7 is a perspective view and a longitudinal cross-sectional view illustrating an inlet pipe applicable to the electrocoagulation device according to one embodiment of the present invention.

Here, as illustrated in FIGS. 5 and 6, an inlet pipe 150 which may spout the raw water supplied from the outside to the first chamber 111 may be disposed in the first chamber 111. Here, as illustrated in FIG. 7, the inlet pipe 150 may have a predetermined length, a plurality of injection holes 151 formed therein in a longitudinal direction, and a hollow shape. Accordingly, the raw water supplied from the outside to the inlet pipe 150 may be spouted to the first chamber 111 through the injection holes 151.

Figure 4:
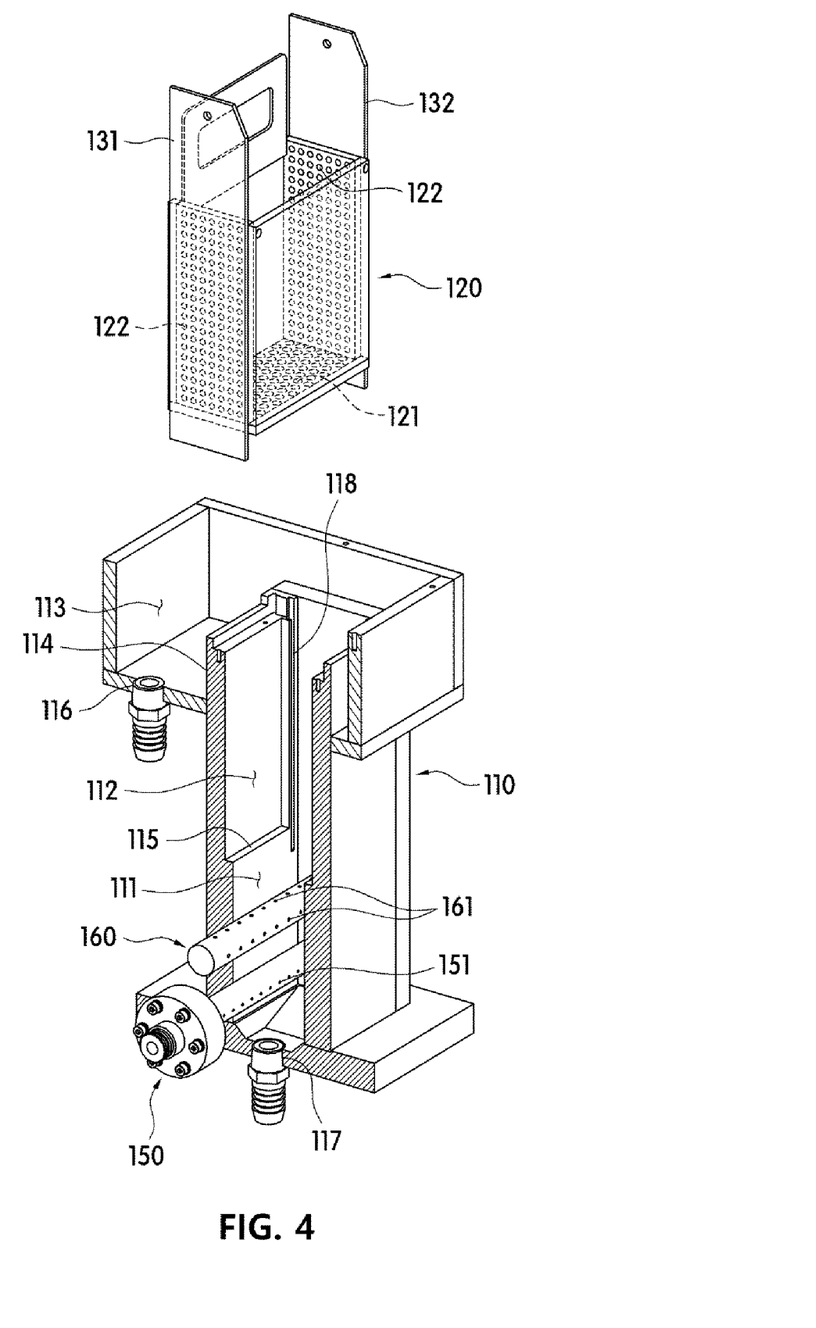
FIG. 4 is a view illustrating a state in which a part of a housing is cut away and the accommodation member is separated from the housing in the electrocoagulation device according to one embodiment of the present invention.

In addition, an outlet hole 117 connected to a drain pipe may be formed in a bottom surface of the first chamber 111 so as to discharge foreign matter separated from the raw water and precipitated. Here, as illustrated in FIG. 4, the bottom surface of the first chamber 111 may be formed as an inclined surface formed to be inclined toward the outlet hole 117. Accordingly, the foreign matter which is separated from the raw water and precipitated may be easily collected to the outlet hole 117 along the inclined surface.

As described above, in the electrocoagulation device 100 according to one embodiment of the present invention, the raw water may be spouted to the first chamber 111 through the injection holes 151 of the inlet pipe 150 to fill the first chamber 111.

Accordingly, a water level of the raw water which fills the first chamber 111 may gradually rise, and the raw water may be introduced into the second chamber 112 in which the accommodation member 120 is disposed while the water level is uniformly maintained.

Then, in the raw water introduced into the second chamber 112, an electrocoagulation reaction may occur due to the two electrode plates 131 and 132 and the conductive masses 140 disposed in the second chamber 112, and the treated water of which the electrocoagulation reaction is completed may pass over an upper end of the sidewall 114 from the second chamber 112 and may be introduced into the third chamber 113.

That is, the raw water introduced into the second chamber 112 may be changed to the treated water through the electrocoagulation reaction, and since the treated water of which the electrocoagulation reaction is completed overflows over the upper end of the sidewall 114, the treated water may move to the third chamber 113. Here, an inner wall which defines the third chamber 113 may be the sidewall 114 which defines the second chamber 112 as described above.

In addition, at least one water drain hole 116 may be formed in a bottom surface of the third chamber 113. Since the water drain hole 116 is connected to a post-processing device through a separate pipe, the pollutants in the raw water coagulated through the electrocoagulation reaction may be transferred to the post-processing device, and the pollutants transferred to the post-processing device may be treated by the post-processing device.

Meanwhile, the housing 110 may be formed of an insulating material or non-conductive material. Accordingly, the housing 110 may be prevented from being short-circuited with the two electrode plates 131 and 132 disposed in the second chamber 112 when power is applied.

As an example, the housing 110 may be formed of plastic, concrete, plywood, or the like but is not limited thereto and may be formed of any well-known insulating material or non-conductive material. In addition, an outer surface of the housing 110 may be coated with a coating layer having at least one property among chemical resistance, corrosion resistance, and electrical insulation. Accordingly, even when heavy metals are contained in the raw water, damage of the surface of the housing 110 due to the heavy metals contained in the raw water may be prevented.

The housing 110 may be fixed using a separate support frame 180. In addition, in the case in which the electrocoagulation device 100 according to one embodiment of the present invention includes the support frame 180, a control part 170 may also be fixed to one side of the support frame 180.

The at least two electrode plates 131 and 132 and the conductive masses 140 may be constitute electrode part configured to coagulate pollutants contained in raw water and may be electrically connected to each other when power is applied.

Accordingly, when the power is applied, metal ions may be eluted from the conductive masses 140 during an electrolysis process, and the metal ions may be coagulated to and adsorbed onto the pollutants contained in the raw water. Accordingly, the pollutants contained in the raw water may be coagulated into flocs having lump forms.

Specifically, when the power is applied to the conductive masses 140 through the at least two electrode plates 131 and 132, the metal ions may be dissolved from the conductive masses 140 to generate hydroxides. In addition, the hydroxides generated through the above-described process may be coagulated with colloidal materials and the like contained in the raw water and precipitated in the raw water.

That is, since the pollutants contained in the raw water may be neutralized with the positive metal ions eluted from the conductive masses 140 due to electrical energy, a coagulation reaction, an oxidation reaction, and a reduction reaction may simultaneously occur. Accordingly, since the pollutants contained in the raw water may be coagulated into the flocs having lump forms, the pollutants may be easily removed. Since the electrocoagulation principle is a well-known principle, a detailed description thereof will be omitted.

Here, in the electrocoagulation device 100 according to one embodiment of the present invention, the electrode part may include the at least two electrode plates 131 and 132 in which serve as power electrodes and the plurality of conductive masses 140 disposed between the at least two electrode plates 131 and 132, unlike conventional electrode part which include a plurality of electrode plates which have plate shapes and are spaced a distance from each other for an electrocoagulation reaction.

Figure 3:
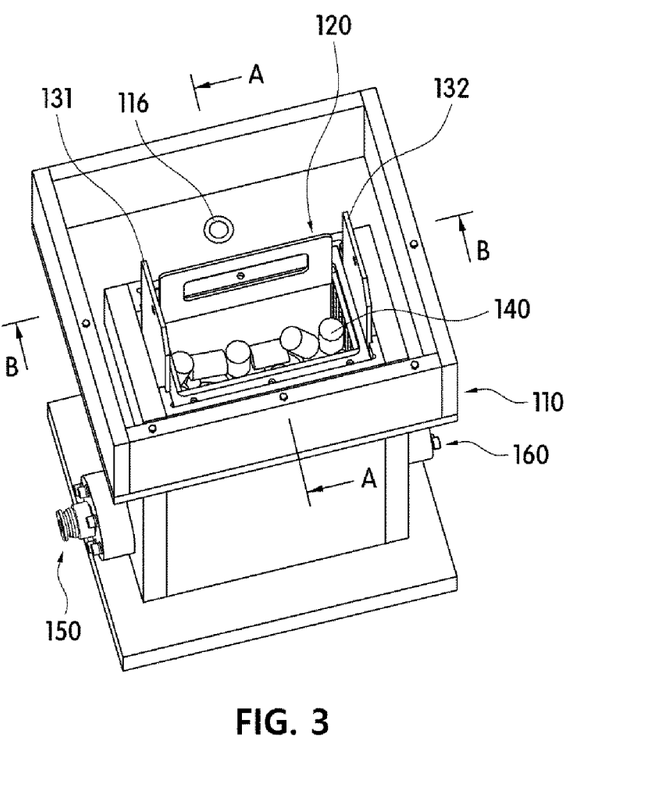
FIG. 3 is a view illustrating a state in which an accommodation member is filled with conductive masses in FIG. 1 when viewed from above.

To this end, as illustrated in FIG. 3, the accommodation member 120 having an accommodation space may be disposed in the second chamber, and the accommodation space may be filled with the plurality of conductive masses 140. In addition, the two electrode plates 131 and 132 may be disposed on outer sides of the accommodation member 120 to face each other. Here, in a case in which three or more electrode plates 131 and 132 are provided, the electrode plates may be suitably disposed on the outer sides of the accommodation member 120.

Here, the accommodation member 120 may include at least one first through hole 121 formed to pass through the accommodation member 120 so as to introduce raw water into the accommodation space from the first chamber 111. In addition, the accommodation member 120 may include at least one second through hole 122 formed to pass through the accommodation member 120 so as to move the raw water introduced through the first through hole 121 to the electrode plates 131 and 132.

As an example, the accommodation member 120 may have a box shape having an open upper portion. In this case, the first through hole 121 may be formed in a bottom surface of the accommodation member 120, and the second through hole 122 may be formed in a side portion of the accommodation member 120 which faces one of the electrode plates 131 and 132.

Accordingly, since the raw water introduced into the accommodation member 120 from the first chamber 111 through the first through hole 121 may surround the conductive masses 140 which fill the accommodation member 120 and move to the two electrode plates 131 and 132 through the second through hole 122, the raw water may maintain a state of being in contact with the two electrode plates 131 and 132.

Accordingly, when power is applied to the two electrode plates 131 and 132, since a predetermined voltage or current is applied to the plurality of conductive masses 140 which fill the accommodation member 120 through the raw water, the above-described electrocoagulation reaction may occur.

In the present invention, the accommodation member 120 and two electrode plates 131 and 132 may be fixed to the second chamber 112 of the housing 110 but may also be detachably coupled to the second chamber 112 of the housing 110.

As an example, as illustrated in FIG. 4, an end step portion 115 may be formed on an inner surface of the housing 110 to support the accommodation member 120, and insertion grooves 118 may be formed inward in a height direction of the second chamber 112 to insert both side ends of the electrode plates 131 and 132 thereinto. Here, the end step portion 115 may be a reference position for dividing the above-described first chamber 111 and the second chamber 112 and may be entirely formed in an inner circumferential direction of the housing 110 or partially formed therein.

Through this, a lower edge of the accommodation member 120 inserted into the second chamber 112 may be supported by the end step portion 115, and the both side ends of the electrode plates 131 and 132 may be inserted into the insertion grooves 118. Accordingly, the two electrode plates 131 and 132 may be disposed on the outer sides of the accommodation member 120 to face each other.

As described above, in the electrocoagulation device 100 according to one embodiment of the present invention, since the accommodation member 120 and the electrode plates 131 and 132 are detachably coupled to the housing 110, in a case in which the accommodation member 120, the electrode plates 131 and 132, and the conductive masses 140 need to be replaced or cleaned, only a corresponding part may be easily separated from the housing 110 and a corresponding operation can be performed.

However, the method of coupling the accommodation member 120, the two electrode plates 131 and 132, and the housing 110 is not limited thereto, and any well-known methods may be applied thereto. As an example, one surfaces of the two electrode plates 131 and 132 may also be directly fixed to one surface of the accommodation member 120.

In addition, a cover 190 coupled to the housing 110 may cover the open upper portion of the accommodation member 120, and a restriction member (not shown) may be detachably coupled to the housing 110 by a coupling member. In this case, since the restriction member restricts an upper edge of the accommodation member 120 inserted into the second chamber 112, the accommodation member 120 may be prevented from being detached.

Meanwhile, as illustrated in FIGS. 5 and 6, the plurality of conductive masses 140 may fill the accommodation space to be in contact with at least some of the adjacent conductive masses 140. Here, air gaps may be formed between the adjacent conductive masses 140 such that raw water easily passes therethrough.

Through this, when power is applied, the plurality of conductive masses 140 may be directly electrically connected to each other through portions thereof in contact with each other, and the raw water may generate hydroxides using metal ions dissolved from the conductive masses 140 while passing through the air gap.

As described above, in the electrocoagulation device 100 according to one embodiment of the present invention, since the plurality of conductive masses 140, which serve as sacrificial electrodes, are in direct contact with each other and are formed into one lump form, power may be directly applied to the conductive masses 140 through the two electrode plates 131 and 132.

Accordingly, since the electrocoagulation device 100 according to one embodiment of the present invention may secure water quality which is higher than or equal to that of a conventional electrocoagulation device in which a plurality of plate-shaped electrode plates are disposed to be spaced a distance from each other, and an amount of power consumption can also be reduced, a manufacturing cost can be reduced.

That is, even when the same current or the same voltage are applied, since a voltage or a current applied to the electrocoagulation device 100 according to one embodiment of the present invention is lower than that applied to a conventional electrocoagulation device which uses plate-shaped electrodes, an amount of power consumption can be reduced, and the electrocoagulation device 100 may secure water quality which is higher than or equal to water quality achieved from a conventional electrocoagulation device.

This may be seen from the following Table 1.

Table 1 below shows result values of items when the electrocoagulation device 100 according to one embodiment of the present invention and a conventional electrocoagulation device treat sea water as the raw water.

In addition, the result values of the items are driven from cases in which the different numbers of plurality of conductive masses 140 having the same size fill the accommodation member 120 of the electrocoagulation device 100 according to one embodiment of the present invention in the following Working Samples 1 to 3, and a conventional electrocoagulation device uses quadrilateral plate-shaped electrodes of Comparative Sample 1.

Working Samples 1 to 3 and Comparative Sample were operated at a constant current of 10 A for 14 hours in a state in which raw water was supplied at a treatment flow rate of 1 m³/hr.

TABLE 1

| Item | Working Sample 1 (Conductive Mass) | Working Sample 2 (Conductive Mass) | Working Sample 3 (Conductive Mass) | Comparative Sample (Quadrilateral Plate-Shaped Electrode Plate) |
| --- | --- | --- | --- | --- |
| Treatment Flow Rate (m³/hr) | 1 | 1 | 1 | 1 |
| Number of Conductive Masses or Quadrilateral Plate-Shaped Electrodes (EA) | 300 | 600 | 1000 | 80 (Size of Quadrilateral Plate-Shaped Electrode Plate: 8 cm * 30 cm) |
| Total Surface Area of Conductive Masses or Quadrilateral Plate-Shaped Electrode Plates (cm²) | 5250 | 10500 | 17500 | 38400 |
| Initial Operating Condition | 10 A/30 V | 10 A/21V | 10 A/19 V | 10 A/70 V |
| Change in Current/Voltage after Operating 14 Hours | 10 A/53 V | 10 A/65 V | 10 A/72 V | 10 A/80 V |
| SDI after Operating 14 Hours | 2.99 | 2.87 | 2.94 | 2.97 |

As shown from above Table 1, in Working Samples 1 to 3 in which sacrificial electrodes were used as conductive masses, an initial operating voltage was lower than that of Comparative Sample.

In addition, in Working Samples 1 to 3 and Comparative Sample, it was seen that an operating voltage was changed to be a higher voltage than an initial voltage in a state in which the supplied current of 10 A was maintained without changing for 14 hours. That is, it was seen that, in Working samples and Comparative Sample, a required voltage value increased as an operating time period increased.

Here, when 14 hours passed, an operating voltage value in Working Samples 1 to 3 is similar to or less than an initial operating voltage value of Comparative Sample, and a silt density index (SDI) was 3 or less in Working Samples 1 to 3 and Comparative Sample.

That is, when 14 hours passed, in Working Samples 1 to 3 and Comparative Sample, similar performance was shown, but in Working Samples 1 to 3, the operating voltage value was similar or less than the initial operating voltage value of Comparative Sample when 14 hours were passed, and thus it was seen that an amount of power consumed in Working Samples 1 to 3 was less than that of Comparative Sample.

Meanwhile, in Working Samples 1 to 3, it was seen that an initial operating voltage was low when an amount of conductive masses which filled the accommodation member increased, however, an operating voltage greatly increased when a time period increased. However, in this case, it was seen that an amount of power consumption was less than that of a conventional case.

That is, in the electrocoagulation device 100 according to one embodiment of the present invention, an amount of conductive masses 140 which fill the accommodation member 120 may be suitably changed according to a kind of raw water to be treated, a treatment capacity of the raw water, and a required SDI of water quality. As an example, the inner space of the accommodation member 120 may be completely filled with the conductive masses 140, or may also be filled therewith to a predetermined height.

In addition, a value of current or a value of a voltage applied to the two electrode plates 131 and 132 may be suitably changed according to a total surface area of the conductive masses 140 which come into contact with raw water.

Figure 9:
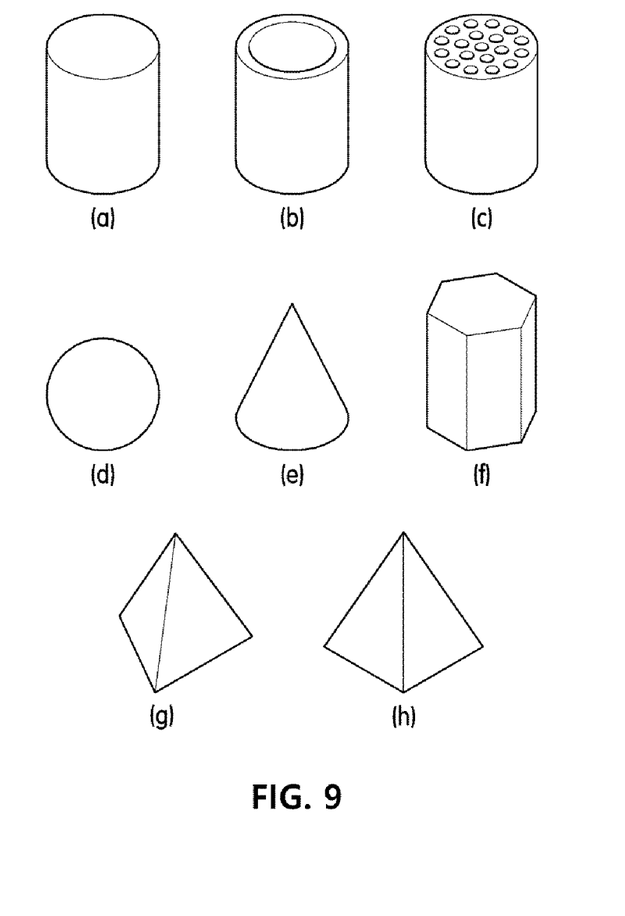
FIG. 9 is a view illustrating various shapes of the conductive masses usable in the electrocoagulation device according to one embodiment of the present invention.

Meanwhile, as illustrated in FIG. 9, each of the conductive masses 140 may have a three-dimensional shape including a cylindrical shape, a spherical shape, a poly pyramid shape, a conical shape, or the like and may also have a three-dimensional shape in which a cylindrical shape, a spherical shape, a poly pyramid shape, a conical shape, and the like are combined with each other.

In addition, at least one through hole may be formed in each of the conductive masses 140 to pass through each of the conductive masses 140 so as to increase an area in contact with raw water. As an example, as illustrated in FIGS. 9B and 9C, the conductive mass 140 may have a hollow pipe shape or a porous shape in which a plurality of through holes are formed to pass through the conductive mass 140. In this case, even when the conductive mass 140 has the same size as that of a conductive mass in which a through hole is not formed, an area of the conductive mass 140 in contact with raw water may relatively increase further.

Meanwhile, the accommodation member 120 may be formed of an insulating material or non-conductive material. Through this, even when power is applied to the electrode plates 131 and 1332, the accommodation member 120 and the electrode plates 131 and 132 may be prevented from being electrically short-circuited.

As an example, the accommodation member 120 may be formed of plastic, concrete, plywood, or the like but is not limited thereto and may be formed of any well-known insulating material or non-conductive material.

In addition, an outer surface of the accommodation member 120 may be coated with a coating layer having at least one property among chemical resistance, corrosion resistance, and electrical insulation. Through this, even when heavy metals are contained in raw water, the accommodation member 120 may be prevented from directly coming into contact with the heavy metals due to the coating layer, and thus damage of the surface of the accommodation member 120 due to heavy metals can be prevented.

Meanwhile, the conductive masses 140 which fill the accommodation member 120 and the electrode plates 131 and 132 may have proper distances therebetween. Accordingly, when power is applied, the conductive masses 140 and the two electrode plates 131 and 132 may be prevented from being short-circuited and power may also be applied thereto.

To this end, the distances between the conductive masses 140 and the electrode plates 131 and 132 may range from 1 to 10 mm, and a thickness of a portion, in which the second through hole 122 is formed, of the accommodation member 120 may range from 1 to 10 mm.

In the present invention, one or two or more of the plurality of electrode plates 131 and 132, which serve as power electrodes, may be provided, and arrangement positions thereof may also be suitably changed.

Here, as described above, each of the electrode plates 131 and 132 and the conductive masses 140 may be formed of any one among iron, aluminum, stainless steel and titanium, or an alloys or in which two or more among the iron, the aluminum, the stainless steel, and the titanium are mixed with each other to elute metal ions when power is applied, and particularly, the two electrode plates 131 and 132 which serve the power electrodes may be formed of an insoluble material such as stainless steel or an titanium alloy such that an excellent coagulation reaction occurs and water quality of treated water rises.

However, materials of the electrode plates 131 and 132 and the conductive masses 140 are not limited thereto, and any well-known various materials which may be used for an electrode for an electrocoagulation reaction may be used as the material.

Meanwhile, as illustrated in FIGS. 4 to 6, in the electrocoagulation device 100 according to one embodiment of the present invention, a diffuser 160 for generating bubbles may be disposed in the first chamber 111 into which raw water is introduced.

That is, the diffuser 160 may be supplied air from the outside, and the air supplied to the diffuser 160 may be spouted to the outside from an inside of the diffuser 160.

Accordingly, the bubbles may be generated during a process in which the air supplied from the outside to the diffuser 160 is spouted to the outside from the inside of the diffuser 160.

Here, the diffuser 160 may be disposed under the second chamber 112 in which the accommodation member 120 is disposed. Through this, the bubbles may be supplied to the accommodation member 120.

Accordingly, when the electrocoagulation device 100 operates, the bubbles may hinder flocs such as polymer hydroxide flocs generated due to an electrocoagulation reaction from being adhered to surfaces of the conductive masses 140 or minimize the attachment. Accordingly, reactivity of the conductive masses 140 may be minimized from being lowered due to the flocs adhered to the surfaces.

In addition, the bubbles may remove pollutants such as the flocs adhered to the surfaces of the conductive masses 140 in a state in which the electrocoagulation device 100 operates. Through this, a usage time period of the conductive masses 140 can be prolonged and constant treatment performance can be maintained.

In addition, in a state in which the electrocoagulation device 100 does not operate, in a case in which the flocs adhered to the surfaces of the conductive masses 140 need to be removed, pollutants such as the flocs adhered to the surfaces of the conductive masses 140 can be easily removed by the bubbles even though the accommodation member 120 is not separated from the housing. In this case, the pollutants separated from the conductive masses 140 may be discharged to the outside through the outlet hole 117 formed in the bottom surface of the first chamber 111.

Figure 8:
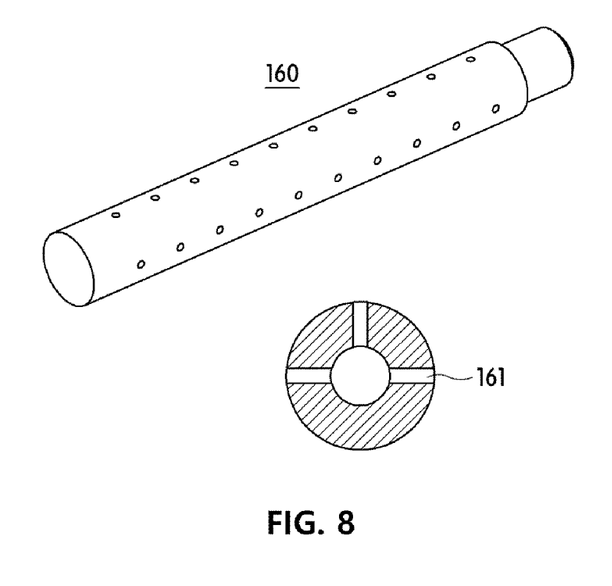
FIG. 8 is a perspective view and a longitudinal cross-sectional view illustrating a diffuser applicable to the electrocoagulation device according to one embodiment of the present invention.

As an example, as illustrated in FIG. 8, the diffuser 160 may be a hollow pipe which has a predetermined length and in which a plurality of discharge holes 161 are formed in a length direction of the diffuser 160, and the diffuser 160 may be disposed in a direction parallel to the inlet pipe 150 disposed in the first chamber 111. Here, the diffuser 160 may be disposed at the same height as the inlet pipe 150 or may also be disposed above or under the inlet pipe 150.

Here, diameters of the discharge holes 161 may range from 0.1 to 10 mm so as to generate bubble having proper sizes. In addition, a distance between the diffuser 160 and the accommodation member 120 may range from 5 to 100 mm and may preferably range from 20 to 30 mm. However, the diameters of the discharge holes 161 and the distance between the diffuser 160 and the accommodation member 120 are not limited thereto and may be suitably changed according to a total treatment capacity of raw water.

Meanwhile, the electrocoagulation device 100 according to one embodiment of the present invention may include the control part 170 for controlling overall operations such as power supply, power blocking, and an amount of power or a current density applied to the electrode plates 131 and 132.

The above-described electrocoagulation device 100 according to one embodiment of the present invention may be applied to a pollutant removing system configured to coagulate pollutants contained in raw water using the electrocoagulation principle and filter coagulated flocs.

Figure 10:
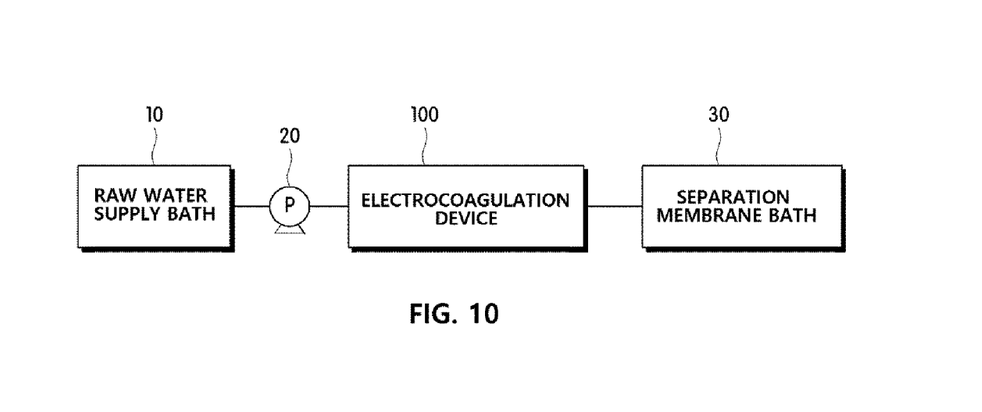
FIG. 10 is a schematic view illustrating an electrocoagulation system in which the electrocoagulation device according to one embodiment of the present invention is applied.

As an example, as illustrated in FIG. 10, the pollutant removing system may include a raw water supply bath 10 which supplies raw water, a separation membrane bath 30 which filters flocs, and the electrocoagulation device 100, and the electrocoagulation device 100 may connect the raw water supply bath 10 and the separation membrane bath 30.

Here, the separation membrane bath 30 may be a well-known filtering apparatus in which at least one filter member is disposed so as to remove the coagulated flocs generated in the electrocoagulation device 100 from the raw water. In addition, a pump 20 may be connected to a front end of the electrocoagulation device 100 so as to easily transfer the raw water from the raw water supply bath 10 to the first chamber 111 of the electrocoagulation device 100.

Accordingly, while the raw water supplied from the raw water supply bath 10 passes through the electrocoagulation device 100, since pollutants contained in the raw water are coagulated due to the electrocoagulation principle, filtering efficiency can be increased in the separation membrane bath 30.

However, an overall configuration of the pollutant removing system is not limited thereto and may also include additional apparatuses such as a precipitation bath, a sludge thickener, a dehydration bath, and a reverse osmosis apparatus which are well-known apparatuses that are included in a general water treatment system.

In addition, the above-described electrocoagulation device 100 may be used as a pre-treatment apparatus in a seawater desalination plant.

While the embodiments of the present invention have been described above, the spirit of the present invention is not limited to the embodiment proposed in this specification, it will be understood by those skilled in the art that other embodiments may be easily suggested by adding, changing, and deleting components, and the other embodiments will fall within the spiritual range of the present invention.

The invention claimed is:
1. An electrocoagulation device comprising:
a housing including an inner space, an inner surface, an end step portion formed on the inner surface, and insertion grooves formed in the inner surface in a height direction of the housing;
an accommodation member removably disposed in the inner space and supported on the end step portion, the accommodation member being formed of an insulating material, wherein the accommodation member includes: an accommodation space defined by a bottom wall and side walls; a plurality of first through holes formed in the bottom wall to introduce a raw water into the accommodation space; and a plurality of second through holes formed in the side walls;
at least two electrode plates which are inserted into the insertion grooves on outer sides of the accommodation member and detachably coupled to the inner surface of the housing to face each other, and to which power supplied from outside of the housing is applied; and
a plurality of conductive masses accommodated inside the accommodation member so as to be disposed away from the at least two electrode plates, wherein each of the conductive masses has a predetermined volume and a cylindrical shape and in contact with adjacent conductive masses so as to form air gaps between neighboring conductive masses;
and the introduced raw water passes through the air gaps and then through the second through holes, and moves to the at least two electrode plates, thereby pollutant contained in the raw water being coagulated,
wherein two or more through holes are formed in each of the conductive masses so as to increase a surface area in contact with the introduced raw water,
wherein the two or more through holes form an angle with respect to the at least two electrode plates, and
wherein a thickness of the side walls ranges from 1 mm to 10 mm.
2. The electrocoagulation device of claim 1, wherein the conductive masses are electrically connected to the at least two electrode plates via the introduced raw water.
3. The electrocoagulation device of claim 1, wherein each of the conductive masses is formed of any one among iron, aluminum, stainless steel, titanium, and an alloy thereof.
4. The electrocoagulation device of claim 1, wherein a magnitude of a current or a voltage of the power is determined according to a total surface area of the conductive masses coming into contact with the introduced raw water.
5. The electrocoagulation device of claim 1, wherein the housing includes:
a first chamber into which the raw water is introduced;
a second chamber disposed above the first chamber, the insertion grooves being formed in the second chamber, and the end step portion being formed between the first chamber and the second chamber; and
a third chamber in which a treated water through an electrocoagulation reaction in the second chamber is temporarily stored.
6. The electrocoagulation device of claim 5, wherein the first chamber includes an inlet pipe which has a predetermined length and in which a plurality of injection holes are formed.

7. The electrocoagulation device of claim 5, wherein the first chamber includes a diffuser which has a predetermined length and in which a plurality of discharge holes are formed,
   wherein the diffuser spouts bubbles through the discharge holes using air supplied from outside of the housing.

8. The electrocoagulation device of claim 1, wherein each of the at least two electrode plates is formed of an insoluble material.

\* \* \* \* \*